Figure 1:
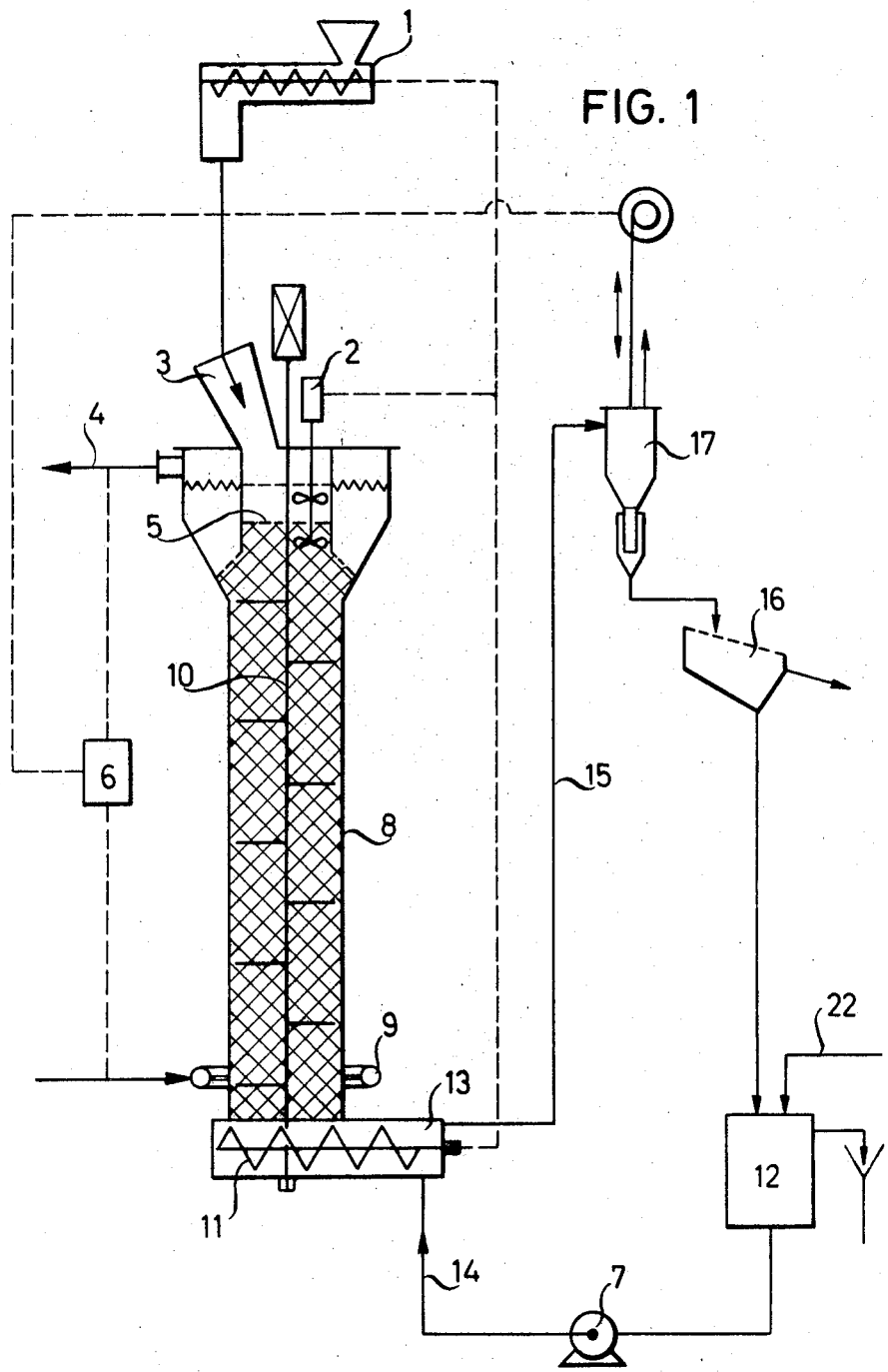

United States Patent
Jürgen-Lohmann et al.

[15] 3,679,268
[45] July 25, 1972

[54] PROCESS FOR DISCHARGING SOLIDS TREATED WITH LIQUIDS FROM VERTICAL COLUMNS

[72] Inventors: Ludwig Jürgen-Lohmann, Frankfurt am Main; Rolf Höltermann, Augsburg, both of Germany

[73] Assignee: Farbwerke Hoechst Aktiengesellschaft vormals Meister Lucius & Bruning, Frankfurt/Main, Germany

[22] Filed: Feb. 3, 1970

[21] Appl. No.: 8,179

[30] Foreign Application Priority Data

Feb. 8, 1969 Germany .................. P 19 06 400.7

[52] U.S. Cl. ............................................. 302/14
[51] Int. Cl. ............................................ B65g 53/04
[58] Field of Search ................ 302/14; 222/395, 318

[56] References Cited

UNITED STATES PATENTS

| | | | |
|---|---|---|---|
| 2,886,210 | 5/1959 | Cooper et al. | 222/395 X |
| 2,645,378 | 7/1953 | Richter | 222/395 X |
| 2,453,458 | 11/1948 | Reed et al. | 302/14 |
| 3,272,335 | 9/1966 | Nettel | 302/14 |

Primary Examiner—Evon C. Blunk
Assistant Examiner—Hadd S. Lane
Attorney—Curtis, Morris & Safford

[57] ABSTRACT

In the process for discharging solids treated with liquids from vertical columns, the treated solids are transported by means of a conveyor to a circulating auxiliary liquid with variable hydrostatic pressure and from there to the subsequent stage of treatment. By varying the hydrostatic pressure of the cycle of auxiliary liquid, the pressure conditions in the system can be adjusted in a manner to permit discharging from the column pure solid or solid with a defined amount of adhering liquid, or introducing defined amounts of liquid from the auxiliary cycle into the column in countercurrent flow with respect to the direction of flow of the solid.

7 Claims, 5 Drawing Figures

INVENTORS
LUDWIG JÜRGEN-LOHMANN
ROLF HOLTERMANN

BY *Curtis, Morris & Safford*
ATTORNEYS

INVENTORS
LUDWIG JÜRGEN-LOHMANN
ROLF HOLTERMANN

BY Curtis, Morris & Safford
ATTORNEYS

INVENTORS
LUDWIG JURGEN-LOHMANN
ROLF HOLTERMANN

BY *Curtis, Morris & Safford*
ATTORNEYS

PROCESS FOR DISCHARGING SOLIDS TREATED WITH LIQUIDS FROM VERTICAL COLUMNS

The present invention relates to a process for discharging solids treated with liquids from vertical columns.

With chemical reactions and/or reactions of exchange between solids and liquids in vertical columns, in which the liquids are conducted either in concurrent or countercurrent flow with respect to the solid, it is desirable and often necessary to discharge the solid without liquid from the column. This is desirable for example, in order to limit to a minimum the amount of liquid in a treatment in countercurrent flow (the solid does not entrain any liquid out of the column). Such a treatment is especially necessary if the solid shall undergo a further treatment in which the liquid of the preceding treatment would be bothersome or even harmful.

It has been proposed to discharge the solid from the column with the aid of screws and double screws scraping along the inner wall, bucket wheels and the like. With discharging devices of this type the direct flow of the liquid in the direction of the flow of solid is interrupted, but it is impossible to prevent the liquid from being discharged from the column as surface liquid together with the solid. Besides the aforesaid disadvantage, the solids often tend to form bridges. In the latter case expensive conveying means are required in the column to maintain the flow of the solid to the discharging device. In many cases the solid forms lumps in the discharging device whereby its transport becomes impossible. Moreover, the solid and the discharging device may suffer from serious damage.

In the process of the present invention the disadvantages of the known processes for discharging solids treated with liquids from vertical columns are avoided by transporting the treated solids with the aid of conveying means to a circulating auxiliary liquid with variable hydrostatic pressure and from there to the following stage of treatment. If the solid has a higher specific gravity than the liquid, it is discharged at the bottom of the column, otherwise it is discharged at the head.

Suitable conveying means are known mechanical means, for example screw conveyors and double screws which do not scrape along the internal wall, conveyor belts with bridges and scraper conveyors. Especially good results are obtained with double screws, particularly double screws arranged side by side in a horizontal plane and acting over the entire free transverse section of the column. The conveyor need not be impermeable to liquids, it must constitute, however, a barrier for the solid.

The circulating of auxiliary liquid with variable hydrostatic pressure which takes over the solid from the conveying means transports the same to the subsequent treatment stage or to a silo. By varying the hydrostatic pressure of the auxiliary liquid, the pressure conditions in the system can be adjusted in a manner such that either pure solid, i.e. solid without adhering liquid, or solid with a defined content of liquid can be discharged, or defined amounts of liquid of the auxiliary cycle can be introduced into the column in countercurrent flow with respect to the flow of the solid.

The hydrostatic pressure is preferably adjusted by an overflow in the circulating auxiliary liquid, the height of which can be varied.

The overflow with variable height can be realized in a very simple manner and, as compared with pumps, it represents a device which can be handled without considerable technical expenditure and with the aid of which the pressure conditions in the system can be continuously adjusted.

The residence time of the solid in the column is regulated with the aid of the mechanical conveying means. The said conveying means may be coupled with a dosing device to feed the solid to the column.

To maintain constant the given pressure conditions in the system, the cycle of auxiliary liquid may be connected by means of a regulating device with the cycle of treating liquid. Comparisons of volume in the cycle of auxiliary liquid are also possible.

To avoid the formation of tunnels in the solid in the column and to facilitate a uniform discharge over the entire cross section of the column, a stirrer may be provided in the column over its whole length.

It has no influence whatsoever on the process of the invention whether the solid is charged to the column in a dry or wet state, or in the form of a suspension.

The process of the invention is now described in further detail by way of example with reference to the accompanying drawings.

Figure 2:
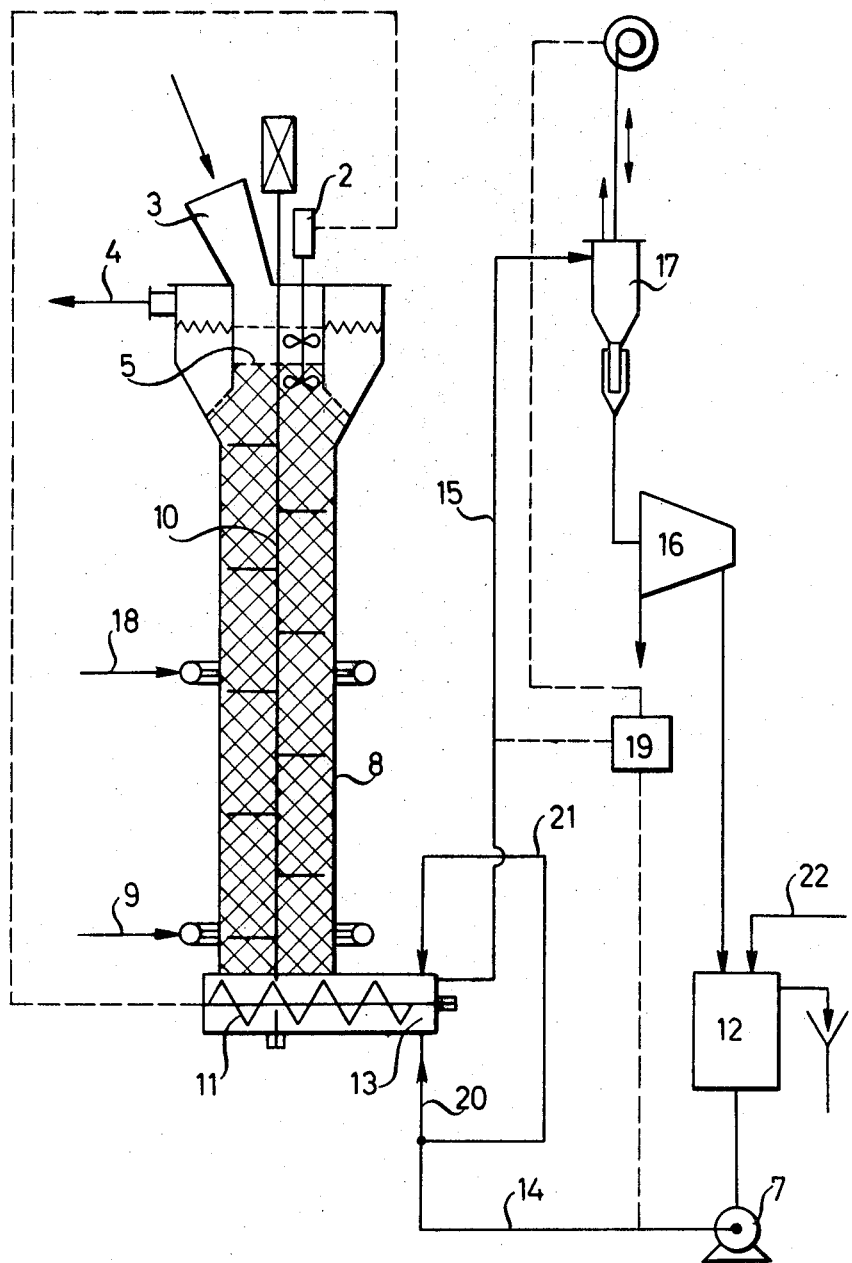
Figure 3:
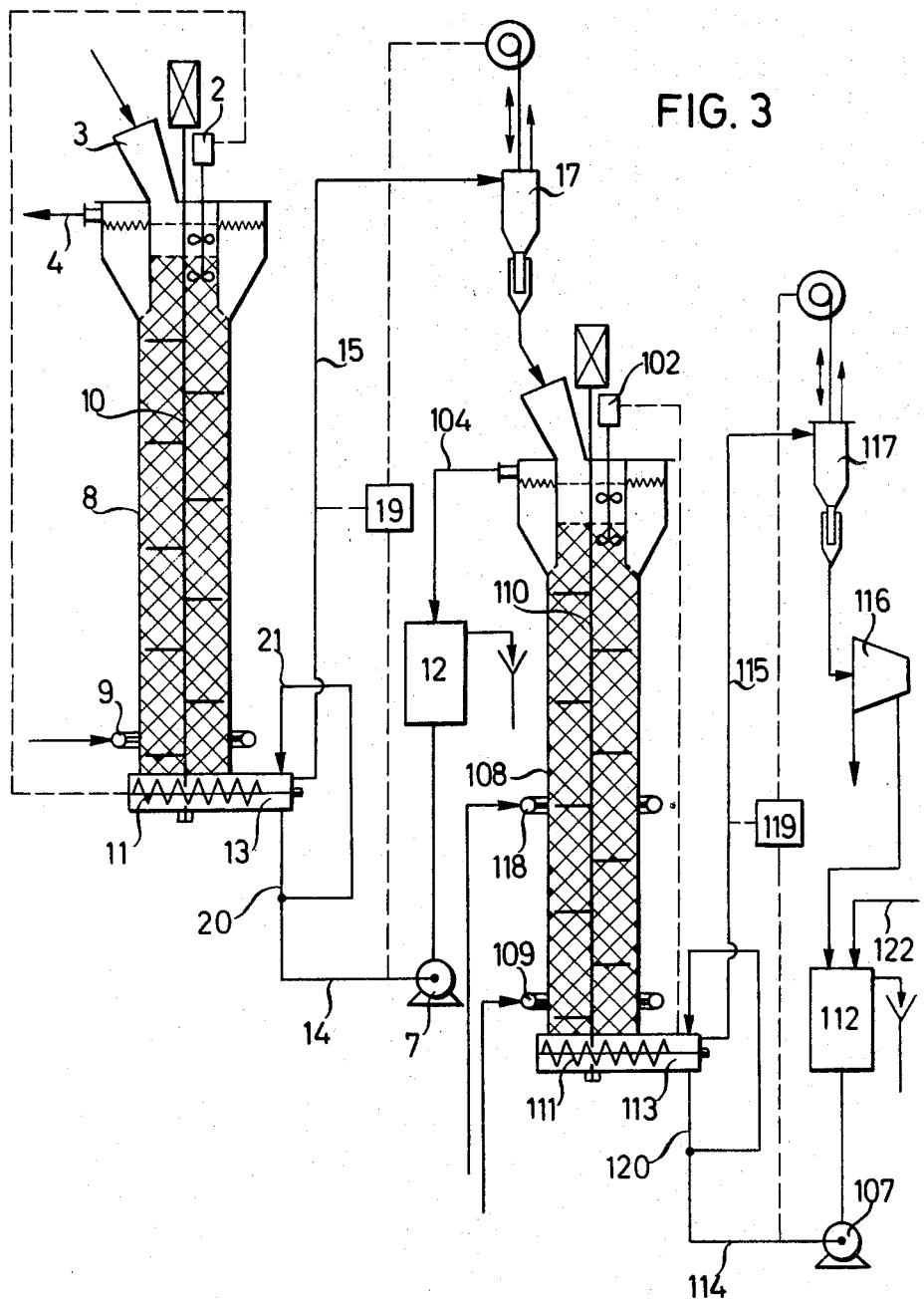
Figure 4:
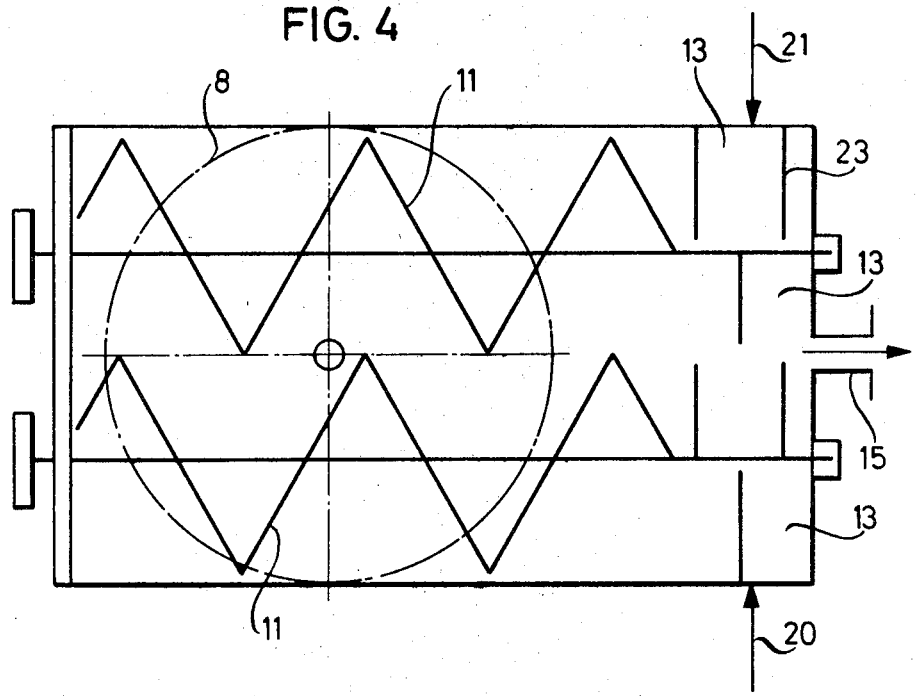
Figure 5:
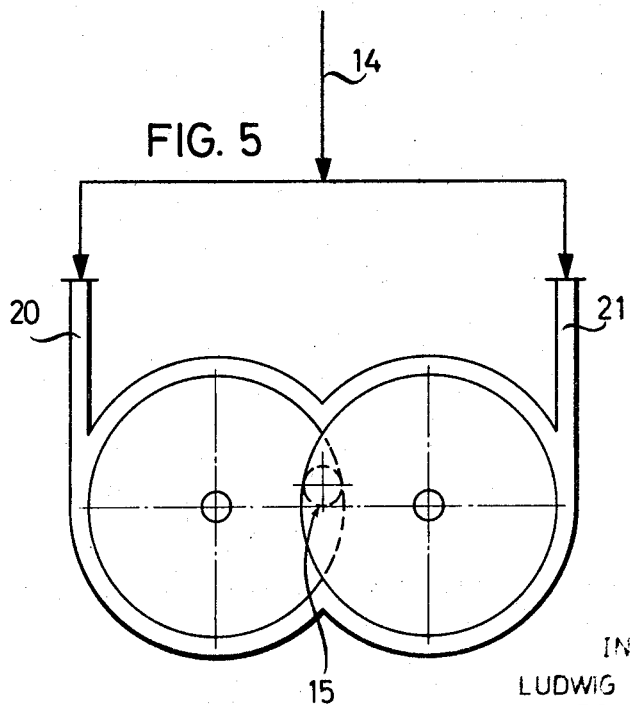

FIG. 1 is a diagram of a device suitable to carry out the process of the invention.
FIG. 2 is a modified device according to FIG. 1.
FIG. 3 represents a device with several stages.
FIG. 4 illustrates the conveying means and
FIG. 5 illustrates the flow of the auxiliary liquid into the conveying means.

The solid to be treated is introduced into column 8 via dosing means 1 and drop shaft 3, the walls of which protruding into the column need not be impermeable to liquids. In column 8 the solid, which has a higher specific gravity than the treating liquid, descends in the form of a column to conveying means 11. From conveying means 11 the solid is transported into rinsing chamber 13. With the aid of an auxiliary liquid entering rinsing chamber 13 through conduit 14 and leaving the said chamber through conduit 15, the solid is conveyed, via an overflow 17 with variable height, to a liquid-solid separating device 16, for example a screening device, a centrifuge, and the like. The auxiliary liquid accumulates in a buffer vessel 12 from where it is pumped by means of pump 7 through conduit 14 into rinsing chamber 13. The auxiliary liquid is replenished through conduit 22. The treating liquid is introduced into column 8 through ring conduit 9 and leaves the column through outlet 4. A regulating device 6 regulates the height of the overflow 17 according to the desired proportion by volume of treating liquid between the inlet and outlet of column 8. The level of the column of solid 5 in column 8 is maintained constant by a level control device 2 regulating the performance of dosing device 1 for the solid and/or the conveying capacity of conveying means 11, for example the number of rotations of a conveyor screw.

Stirrer 10 shall avoid the formation of tunnels in the solid.

In the device as shown in FIG. 2 the height of the overflow 17 is regulated by regulating device 19 which compares the volume of the auxiliary liquid in conduits 14 and 15. The liquid is introduced into rinsing chamber 13 through conduits 20 and 21 which preferably feed equal amounts to the rinsing chamber. This mode of operation is suitable for a single treatment and also for two series-connected treatments. In the case of the neutralization of an acid or alkaline product with subsequent washing out of the salts formed, the treating liquid for the first treatment is introduced into column 8 through ring conduit 18, and the liquid for the second treatment is introduced through ring conduit 9. If required, three or more treatments can be carried out in the same manner in one column.

When the solid is to be treated several times and the individual treating liquids are incompatible with one another, the treatment of the solid is suitably carried out in a device comprising a plurality of columns corresponding to the number of treatments and connected in the form of a cascade. When, for example, in a suspension of a solid in which the liquid phase contains a readily saponifiable ester and the solid likewise constitutes an ester, only the latter ester shall be partially saponified while the former shall be recovered without having undergone saponification, it is suitable to use two columns connected in series as shown in FIG. 3. In an arrangement of this type the solid treated in column 8, i.e., in the aforesaid example, the solid freed from liquid or dissolved ester, is directly transported to column 108 together with the auxiliary liquid through overflow 17 having a variable height.

In this case the treating liquid leaving column 108 through conduit 104 can be used as auxiliary liquid. To adjust the pressure conditions in the system, regulating device 19 regulates the overflow 17 by comparison of the volume of liquid in conduits 14 and 15. In the present example, the solid is subjected in column 108 to a twofold treatment, namely saponification in an alkaline medium and washing out of the alkali. The treating liquids are introduced through conduits 109 and 118. The overflow 117 is adjusted by regulating device 119 in a manner analogous to that of the preceding stage. It is likewise possible, of course, to arrange in cascade connection a greater number of columns.

The conveying means 11 illustrated in FIG. 4 consist of a double screw. Column 8 is seated without any reduction of its cross section on the conveying means 11. In rinsing chamber 13 prongs and forks 23 may be provided to disintegrate agglomerates that may form. The auxiliary liquid enters rinsing chamber 13 through conduits 20 and 21 and leaves the said chamber through conduit 15 together with the solid.

It has proved advantageous tangentially to introduce the auxiliary liquid into rinsing chamber 13 through conduits 20 and 21 as shown in FIG. 5. In this manner two centrifugal fields are formed so that the solid conveyed by conveying means 11 is well suspended in the auxiliary liquid and passed into conduit 15 together with the auxiliary liquid.

The hydrostatic pressure of the auxiliary liquid can be varied not only by means of overflow 17 with variable height but also by changing the resistance to flow. In the latter case regulating device 19 can be controlled, for example, by a pinch valve or — if a finer graduation of the hydrostatic pressure is desired — by a telescope-like tube to lengthen the path. The pinch valve and the telescope-like tube may, of course, also be used in connection with an overflow with variable height.

What we claim is:

1. A process for discharging solids treated with a liquid from a vertical column and separating said solids from said treating liquid which comprises conveying the treated solids from the column by means of a mechanical conveyor to a rinsing chamber, removing said solids from the rinsing chamber with a circulating auxiliary liquid having a hydrostatic pressure preselected to separate substantially all or a preselected portion of the treating liquid from the solids and then transferring said solids to a subsequent column or stage of treatment with the aid of the auxiliary liquid.

2. The process of claim 1, wherein the conveying means discharge the solid at the head of the column.

3. The process of claim 1, wherein the conveying means discharge the solid at the bottom of the column.

4. The process of claim 1, wherein the hydrostatic pressure is adjusted by an overflow means in the path of the circulating auxiliary liquid.

5. The process of claim 1 wherein the solids are treated with more than one treating liquid.

6. The process of claim 5 wherein the solids are treated in a plurality of columns.

7. In a process for continuously treating solids in a vertical column with a treating liquid, removing the solids from said column and separating the treating liquid from said solids, the improvement which comprises continuously removing, by means of a mechanical conveyor, treated solids from the column to a rinsing chamber while introducing solids to be treated into the column to maintain a substantially constant level of solids therein; continuously rinsing the treated solids and conveying them to a separator with a circulating auxiliary liquid having a hydrostatic pressure preselected to separate substantially all or a predetermined portion of the treating liquid from the solids; and then separating said solids from the circulating liquid.

* * * * *